(12) United States Patent
Eweje et al.

(10) Patent No.: US 10,886,750 B2
(45) Date of Patent: Jan. 5, 2021

(54) APPARATUS FOR MANAGING ENERGY INPUT AND ENERGY RANKING SYSTEM

(71) Applicant: WATT Renewable Corporation, Calgary (CA)

(72) Inventors: Oluwole Eweje, Calgary (CA); Akinsola Eweje, Calgary (CA); Sherisse Alexander, Sherwood Park (CA); Parveen Sandi, Calgary (CA)

(73) Assignee: WATT RENEWABLE CORPORATION, Calgary (CA)

( * ) Notice: Subject to any disclaimer, the term of this patent is extended or adjusted under 35 U.S.C. 154(b) by 0 days.

(21) Appl. No.: 16/262,193

(22) Filed: Jan. 30, 2019

(65) Prior Publication Data
US 2020/0185925 A1 Jun. 11, 2020

(30) Foreign Application Priority Data

Dec. 6, 2018 (CA) ...................................... 3026685

(51) Int. Cl.
| | | |
|---|---|---|
| *G05B 19/042* | (2006.01) | |
| *H02J 3/32* | (2006.01) | |
| *H02J 3/46* | (2006.01) | |
| *H02J 3/38* | (2006.01) | |

(52) U.S. Cl.
CPC .............. *H02J 3/46* (2013.01); *G05B 19/042* (2013.01); *H02J 3/32* (2013.01); *H02J 3/381* (2013.01); *G05B 2219/2639* (2013.01)

(58) Field of Classification Search
CPC . G05B 19/042; G05B 2219/2639; H02J 3/32; H02J 3/381; H02J 3/46
See application file for complete search history.

(56) References Cited

U.S. PATENT DOCUMENTS

| | | | |
|---|---|---|---|
| 8,008,808 B2 * | 8/2011 | Seeker | H02J 3/385 307/72 |
| 8,552,590 B2 | 10/2013 | Moon et al. | |
| 9,583,942 B2 * | 2/2017 | Czarnecki | H02J 9/062 |
| 9,711,967 B1 | 7/2017 | Czarnecki | |

(Continued)

*Primary Examiner* — Abdelmoniem I Elamin
(74) *Attorney, Agent, or Firm* — Davis & Bujold PLLC; Michael J. Bujold

(57) ABSTRACT

An apparatus for managing energy input is provided. The apparatus has a container with an interior that houses an energy ranking system, an energy management system and a storage device. The container has at least two power input connections and a power output connection. Each of the at least two power input connections is connectable to a power generation system. The power output is connectable to a load. The energy ranking system has at least two power inputs in communication with the at least two power input connections and a power output. The energy ranking system selects at least one of the at least two power generation systems for providing power to an energy management system. The energy ranking system selects at least one of the power generation systems based upon a predetermined set of parameters. The energy management system has a power input in communication with the power output of the energy ranking system and a power output in communication with the power output connection of the container. The storage device is provided in communication with the energy management system.

18 Claims, 4 Drawing Sheets

(56) References Cited

U.S. PATENT DOCUMENTS

| | | | |
|---|---|---|---|
| 9,800,051 B2* | 10/2017 | Laubenstein | H02M 3/04 |
| 10,291,028 B2* | 5/2019 | Novak | H02J 3/383 |
| 10,414,282 B2* | 9/2019 | Nazarian | H02M 7/68 |
| 10,454,277 B2* | 10/2019 | Koeppe | H02J 3/381 |
| 2010/0181837 A1* | 7/2010 | Seeker | H02J 1/102 |
| | | | 307/72 |
| 2011/0140520 A1 | 6/2011 | Lee | |
| 2012/0267957 A1* | 10/2012 | Czarnecki | H02J 9/062 |
| | | | 307/64 |
| 2013/0082529 A1 | 4/2013 | Wolter | |
| 2013/0249298 A1* | 9/2013 | Dong | H02J 7/34 |
| | | | 307/80 |
| 2014/0008155 A1 | 1/2014 | Rossignol | |
| 2014/0054965 A1* | 2/2014 | Jain | H02J 3/46 |
| | | | 307/65 |
| 2015/0008737 A1 | 1/2015 | Mao | |
| 2015/0108839 A1 | 4/2015 | Annavajjhala et al. | |
| 2017/0214245 A1* | 7/2017 | Nazarian | B60L 53/60 |

* cited by examiner

APPARATUS FOR MANAGING ENERGY INPUT AND ENERGY RANKING SYSTEM

FIELD OF THE DISCLOSURE

The present application relates generally to energy storage system, more specifically it relates to an energy storage system for managing multiple sources of energy.

BACKGROUND

This section provides background information to facilitate a better understanding of the various aspects of the invention. It should be understood that the statements in this section of this document are to be read in this light, and not as admissions of prior art.

Various forms of energy may be used to harness electric power. When more than one form of energy may be used for a given task, it is often difficult to choose which type of power to utilize. In addition, when a specific type of energy is used, it must be set up and changing the power source can be a challenge. A system that is capable of utilizing more than one form of energy and switching between them would allow for energy to be used effectively.

BRIEF SUMMARY

There is provided an energy storage system that has at least two power generation systems, an energy ranking system, an energy management system and a storage device. The energy ranking system selects at least one of the at least two power generation systems for providing power to the energy management system. The energy ranking system has at least two power inputs corresponding to the at least two power generations systems and a power output. The energy ranking systems selects at least one of the at least two power generation systems for providing power to the energy management system based upon a predetermined set of user parameters. The energy management system is provided in communication with the power output of the energy ranking system. The energy management system has an energy output in communication with a load. A storage device for storing energy is provided in communication with the energy management system.

In one embodiment, the predetermined set of user parameters is a cost to utilize each of the at least two power generation systems. Time of day may also be included in the predetermined set of user parameters.

In another embodiment, the energy ranking system has an on/off switch for each of the at least two power generation systems and a ranking mechanism for ranking the order in which the at least two power generation systems provide energy to the energy management system. Each of the on/off switches controls a flow of power from the at least two power generation systems to the energy management system.

In one embodiment, the energy ranking system also includes a breaker in communication with each of the at least two power generation systems. When activated, each of the breakers will cause a loss of flow of power from the corresponding at least two power generation systems to the energy ranking system. The breaker may be an electronically resettable breaker to allow for effective resetting without requiring mechanical resetting.

In one embodiment, the energy ranking system has a timer. The timer may assist with the ranking of the at least two power generation systems. For example, the timer may indicate that it is an inappropriate time to attempt to draw from a solar power generation system. The timer may also be used to determine a recalculation window for the energy ranking system to re-rank the at least two power generation systems.

In one embodiment, the on/off switch is a variable on/off switch that allows for variable amounts of energy can be transferred to the ranking mechanism based upon the ranking mechanism.

In another embodiment, the energy management system has a converter, an inverter, a switch and a controller. The converter is provided in communication with the power output of the energy ranking system. The inverter is provided in communication with the converter and in communication with the switch. The switch controls the flow of electricity to the load. The controller is provided in communication with the converter and the inverter for controlling the flow of electricity to the storage device through a battery management system.

In one embodiment, the energy management system has a grid energy input. It is preferable that the grid energy input be in communication with the switch within the energy management system.

In another embodiment, a feedback loop is provided in communication with the energy ranking system and the storage device for monitoring the flow of power to the storage device. The feedback loop may provide information to the energy ranking system regarding the storage device charge and the amount of energy flowing into the storage device.

There is also provided an energy ranking system. The energy ranking system has at least two power inputs, a power output, on/off switches and a ranking mechanism. Each of the at least two power inputs is connectable to a power generation system and the power output is connectable to an energy management system. The on/off switches are provided for each of at least two power inputs. The on/off switches control the flow of power from the power generation systems to the energy management system. The ranking mechanism ranks the order in which the power generation systems provide energy to the energy management system. The ranking mechanisms selects at least one of the power generation systems for providing power to the energy management system based upon a predetermined set of user parameters.

In one embodiment, the energy ranking system has a breaker in communication with each of the at least two power inputs such that activation of the breaker causes a loss of flow of power from the corresponding power generation system to the energy ranking system. The breaker may be an electronically resettable breaker to allow for effective resetting without requiring mechanical resetting.

In one embodiment, the predetermined set of user parameters is a cost to utilize each of the at least two power generation systems. Time of day may also be included in the predetermined set of user parameters.

In one embodiment, the energy ranking system has a timer. The timer may assist with the ranking of the at least two power generation systems. For example, the timer may indicate that it is an inappropriate time to attempt to draw from a solar power generation system. The timer may also be used to determine a recalculation window for the energy ranking system to re-rank the at least two power generation systems.

In one embodiment, the on/off switch is a variable on/off switch that allows for variable amounts of energy can be transferred to the ranking mechanism based upon the ranking mechanism.

There is also provided an apparatus for managing energy input. The apparatus has a container, an energy ranking system, an energy management system and a storage device. The container has an interior, at least two power input connections and a power output connection. Each of the at least two power input connections is connectable to a power generation system. The power output is connectable to a load. The energy ranking system, the energy management system and the storage device are positioned within the container. The energy ranking system has at least two power inputs in communication with the at least two power input connections and a power output. The energy ranking system selects at least one of the power generation systems for providing power to the energy management system. The energy ranking system selects at least one of the power generation systems for providing power to the energy management system based upon a predetermined set of user parameters. The energy management system has a power input in communication with the power output of the energy ranking system and a power output in communication with the power output connection of the container. The storage device is provided in communication with the energy management system.

In one embodiment, the predetermined set of user parameters is a cost to utilize each of the at least two power generation systems. Time of day may also be included in the predetermined set of user parameters.

In another embodiment, the energy ranking system has an on/off switch for each of the at least two power input connections and a ranking mechanism for ranking the order in which the at least two power generation systems provide energy to the energy management system. Each of the on/off switches controls a flow of power from the corresponding power generation systems to the energy management system.

In one embodiment, the energy ranking system also includes a breaker in communication with each of the at least two power input connections. When activated, each of the breakers will cause a loss of flow of power from the corresponding power generation system to the energy ranking system. The breaker may be an electronically resettable breaker to allow for effective resetting without requiring mechanical resetting.

In one embodiment, the energy ranking system has a timer. The timer may assist with the ranking of the at least two power generation systems. For example, the timer may indicate that it is an inappropriate time to attempt to draw from a solar power generation system. The timer may also be used to determine a recalculation window for the energy ranking system to re-rank the at least two power generation systems.

In another embodiment, the energy manage system has a converter, an inverter, a switch and a controller. The converter is provided in communication with the power output of the energy ranking system. The inverter is provided in communication with the converter and in communication with the switch. The switch controls the flow of electricity to the load. The controller is provided in communication with the converter and the inverter for controlling the flow of electricity to the storage device through a battery management system.

In one embodiment, the apparatus for managing energy input has a grid energy input on the container. The grid energy input is in communication with the energy management system. The grid energy input may be in communication with the switch within the energy management system.

In another embodiment, a feedback loop is provided in communication with the energy ranking system and the storage device for monitoring the flow of power to the storage device. The feedback loop may provide information to the energy ranking system regarding the storage device charge and the amount of energy flowing into the storage device.

In one embodiment, the on/off switch is a variable on/off switch that allows for variable amounts of energy can be transferred to the ranking mechanism based upon the ranking mechanism.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
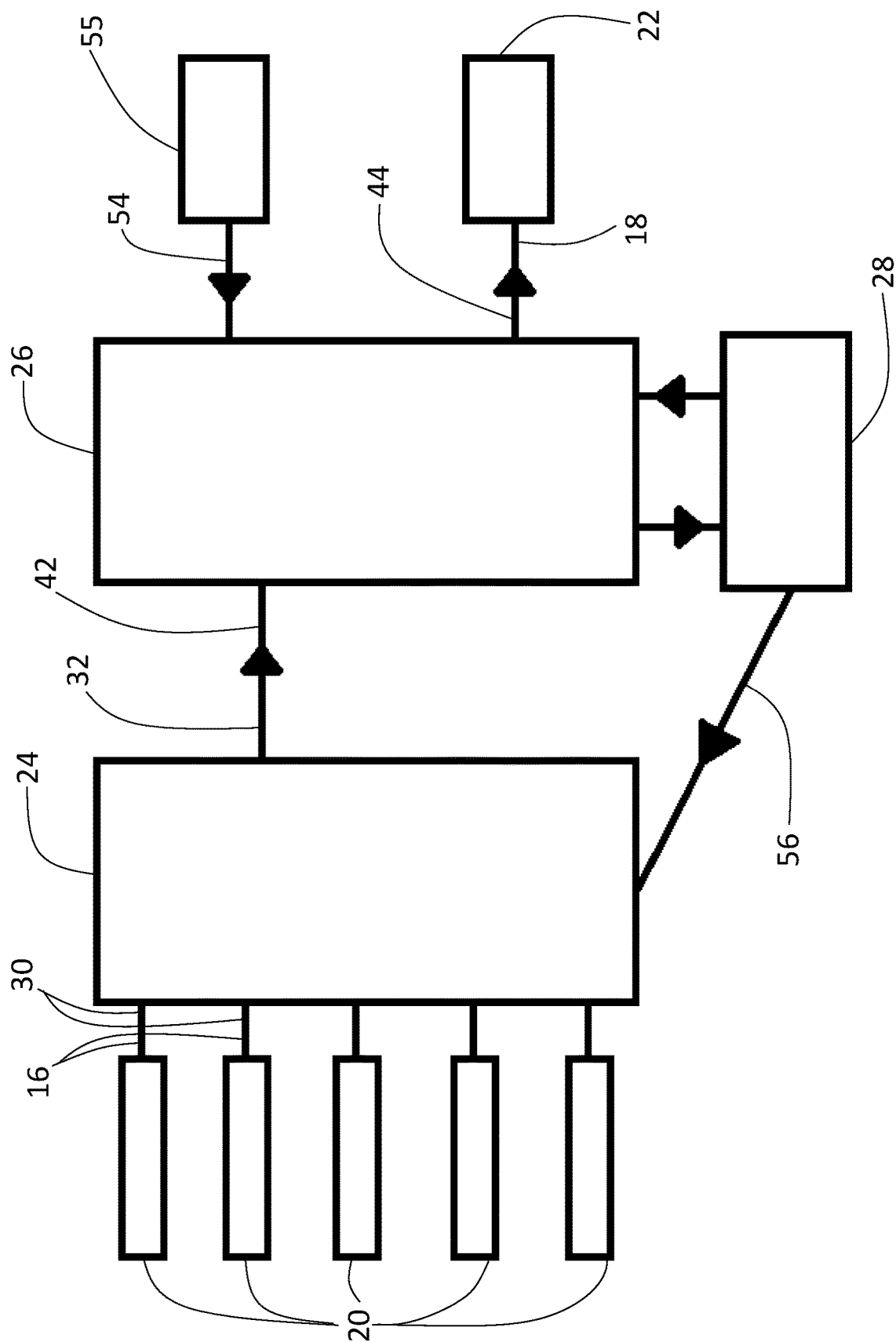
FIG. 1 is a schematic view of the components of an apparatus for managing energy input.

An apparatus for managing energy input, generally identified by reference numeral 10, will now be described with reference to FIG. 1 through FIG. 4.

Figure 4:
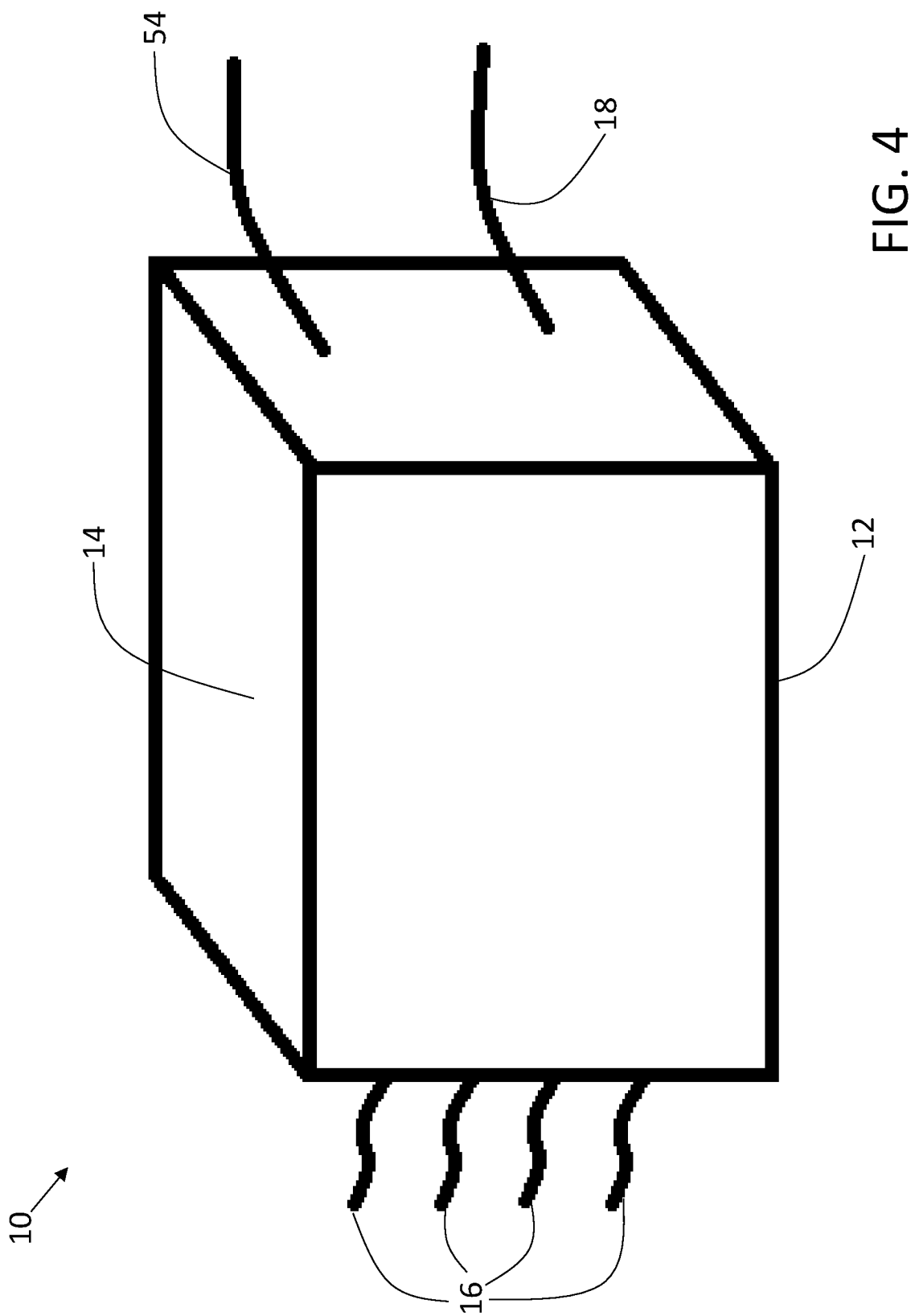
FIG. 4 is a perspective view of the apparatus for managing energy input.

Referring to FIG. 4, an apparatus for managing energy input 10 has a container 12 with an interior 14. Container 12 has at least two power input connections 16 and a power output connection 18. Referring to FIG. 1, each of the at least two power input connections 16 are connectable to a power generation system 20. Power generation systems may include, but are not limited to, solar power systems, wind power systems, battery power systems, generator systems and grid power systems. Power output connection 18 is connectable to a load 22. Load 22 is generally defined as any item connected to power output connection 18 that utilizes power to work. Container 12 houses an energy ranking system 24, an energy management system 26 and a storage device 28 within interior 14.

Energy ranking system 24 has at least two power inputs 30 in communication with the at least two power input connections 16 and a power output 32. Energy ranking system 24 selects one or more of power generations systems 20 to provide power to energy management system 26. Energy ranking system 24 selects which power generation systems 20 to use based upon a predetermined set of user parameters. The predetermined set of user parameters may include the cost to run a specified power generation system 20, the time of day, availability or any other relevant consideration. The time of day can be used to preclude the use of specified power generation systems 20 at particular times. For example, energy ranking system 24 may be precluded from utilizing solar power generation between the hours of 8 pm to 8 am or may be programmed to only utilize generator power under certain specific circumstances.

Figure 2:
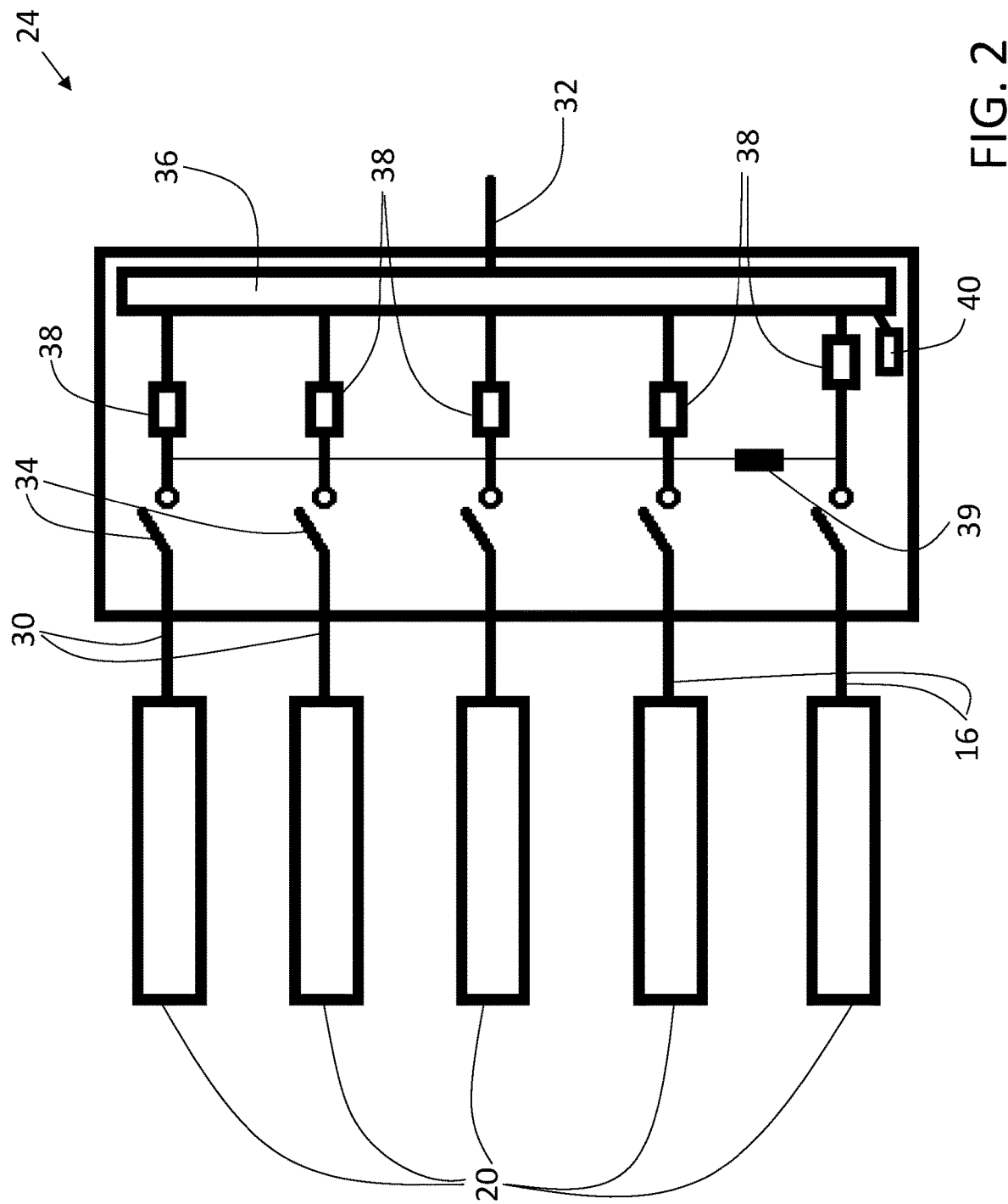
FIG. 2 is a schematic view of the energy ranking system.

Referring to FIG. 2, energy ranking system 24 has on/off switches 34 for each of power input connections 16. On/off switches 34 control the flow of power from power generation systems 20 to energy management system 26. Each of on/off switches 34 are controlled independently to allow power from corresponding power generation systems 20 to be individually selected for use. The on/off switches 34 may be variable switches that allow variable power through the switch when in the on position. A ranking mechanism 36 ranks the order in which power generation systems 20 provide energy to energy management system 26. Ranking of power generation systems 20 is determined by a predetermined set of user parameters. Breakers 38 may be provided in communication with each of power input connections 16 such that activation of breakers 38 cause a loss of flow of power from corresponding power generation systems 20 to energy ranking system 24. Breakers 38 may be electronically resettable breakers to allow for quick resetting of breakers as needed. Breakers 38 may be usable as fail safes in the event of a power surge or other problem with apparatus 10. Automatic transfer switches 39 allow for the transfer of power between power generation sources 20. An automatic transfer switch 39 may be beneficial where a generator is used in the event of a power failure or outage. A timer 40 may also be provided within energy ranking system 24. Timer 40 may assist with the ranking of power generation systems 20. For example, timer 40 may indicate that it is an inappropriate time to attempt to draw from a solar power generation system. Timer 40 may also be used to determine a recalculation window for ranking mechanism 36 to re-rank power generation systems 20.

Figure 3:
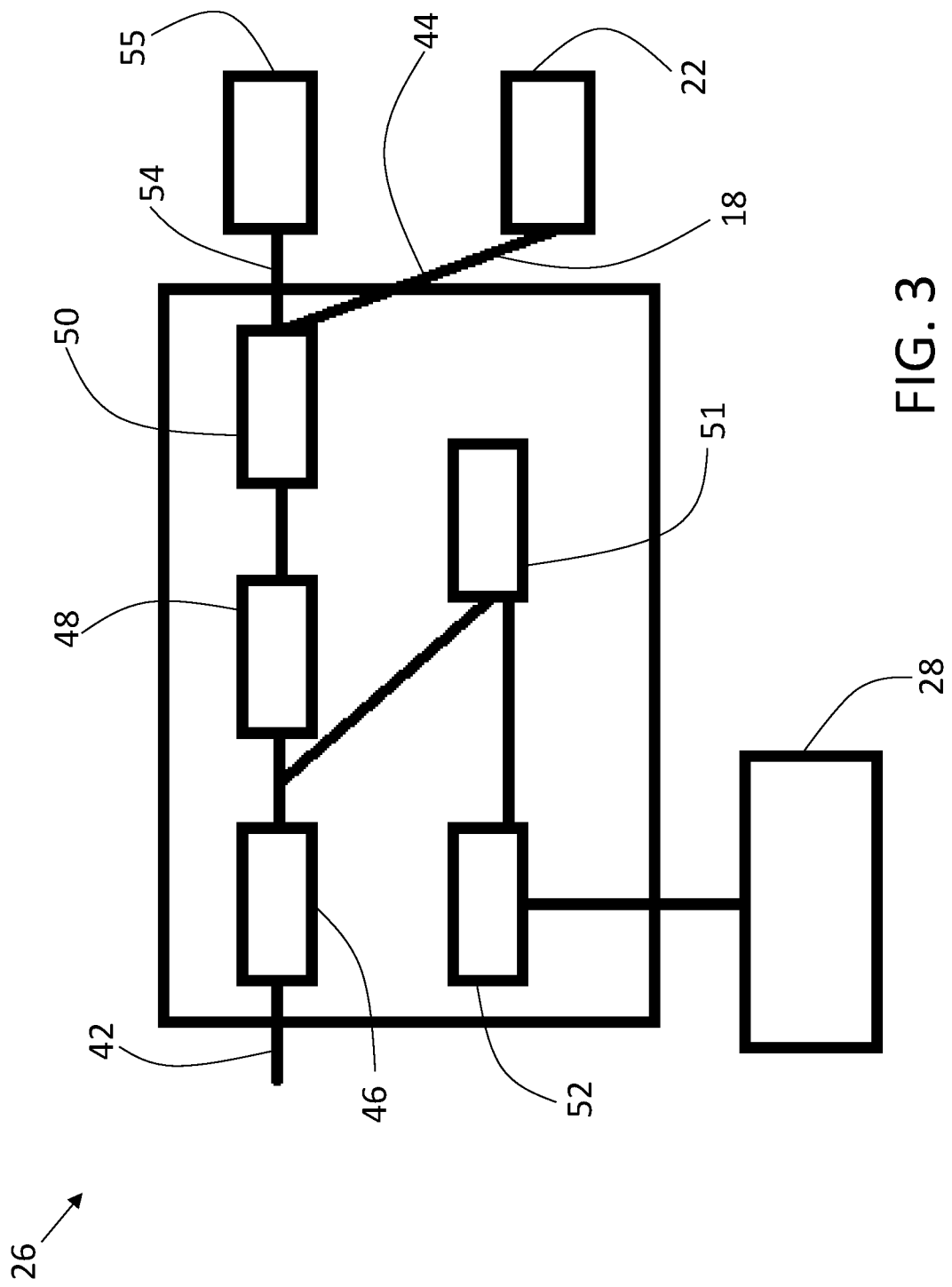
FIG. 3 is a schematic view of the energy management system.

Referring to FIG. 1, energy management system 26 has a power input 42 in communication with power output 32 of energy ranking system 24 and a power output 44 in communication with power output connection 18 of container 12. Storage device 28, such as a battery, is provided in communication with energy management system 26 for storing energy. Referring to FIG. 3, energy management system 26 has a converter 46 in communication with power output 32 of energy ranking system 24. What is the purpose of the converter?? Converter 46 may be an MPPT converter when solar or wind are used as power generation systems 20, however it will be understood that other types of converters may also be used. An inverter 48 is provided in communication with converter 46. A switch 50 is provided in communication with inverter 48 and controls the flow of electricity to load 22. A controller 51 is provided in communication with converter 46 and inverter 48 for controlling the flow of electricity to storage device 28 through a battery management system 52.

Referring to FIG. 4, a grid energy input 54 may be provided on container 12. Referring to FIG. 1, grid energy input 54 allows for charging of storage device 28 or operation of load 22 from grid energy source 55. Grid energy input 54 is provided in communication with energy management system 26 and is preferably in communication with switch 50. When grid energy input 54 is connected to a grid energy source 55, switch 50 controls the flow of power to load 22 and storage device 28. Switch 50 may also be used to prevent the flow of electricity from the grid energy source to load 22 and/or storage device 28.

A feedback loop 56 may be provided to allow communication between energy ranking system 24 and storage device 28. More specifically, feedback loop 56 allows communication between ranking mechanism 36 and storage device 28. This allows the flow of power to storage device to be monitored. Feedback loop 56 may be used to signal that storage device 28 is receiving an insufficient flow of energy or an overflow of energy. A signal indicating an insufficient flow of energy would cause energy ranking system 24 to allow additional power flow from a highly ranked power generation system 20 or may cause an additional power generation system 20 to also be used. The order in which additional power generation systems 20 are used is dependent upon the ranking of each individual power generation system 20. A signal for an overflow of energy would cause energy ranking system 24 to limit power flow from the least highly ranked power generation system 20 with an on/off switch in the on position or may cause a breaker 38 to be activated to stop the flow of energy from a specified power generation system 20.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. An energy storage system, comprising:
   at least two power generation systems;
   an energy ranking system for selecting at least one of the at least two power generation systems for providing power to an energy management system, the energy ranking system having at least two power inputs corresponding to the at least two power generation systems and a power output, the energy ranking system selecting at least one of the at least two power generation systems for providing power to the energy management system based upon a predetermined set of user parameters, the energy ranking system further comprising:
      a variable on/off switch for each of the at least two power generation systems, and each of the on/off switches controlling a flow of power from the at least two power generation systems to the energy management system; and
      a ranking mechanism for ranking an order in which the at least two power generation systems provide energy to the energy management system, and the ranking mechanism recalculating the ranking order of the at least two power generation systems at predetermined intervals;
   the energy management system in communication with the power output of the energy ranking system, the energy management system having an energy output in communication with a load; and
   a storage device for storing energy in communication with the energy management system.

2. The energy storage system of claim 1 wherein the predetermined set of user parameters is a cost to utilize each of the at least two power generation systems.

3. The energy storage system of claim 1 wherein the energy ranking system further comprises a breaker in communication with each of the at least two power generation systems such that activation of each of the breakers will cause a loss of flow of power from the corresponding at least two power generation systems to the energy ranking system.

4. The energy ranking system of claim 3 wherein the breaker is an electronically resettable breaker.

5. The energy storage system of claim 1 wherein the energy ranking system further comprises a timer.

6. The energy storage system of claim 1 wherein the energy management system comprises:
   a converter in communication with the power output of the energy ranking system;
   an inverter in communication with the converter;
   a switch in communication with the inverter, the switch controlling the flow of electricity to the load; and
   a controller in communication with the converter and the inverter for controlling the flow of electricity to the storage device through a battery management system.

7. The energy storage system of claim 1 wherein the energy management system further comprises a grid energy input.

8. The energy storage system of claim 7 wherein the grid energy input is in communication with the switch.

9. The energy storage system of claim 1 further comprising a feedback loop in communication with the energy ranking system and the storage device for monitoring the flow of power to the storage device.

10. An apparatus for managing energy input, comprising:
    a container having an interior, at least two power input connections and a power output connection, each of the at least two power input connections being connectable to a power generation system, the power output being connectable to a load;
    an energy ranking system positioned within the container, the energy ranking system having at least two power inputs in communication with the at least two power input connections and a power output, the energy ranking system selecting at least one of the at least two power generation systems for providing power to an energy management system, the energy ranking system selecting at least one of the power generation systems for providing power to the energy management system based upon a predetermined set of user parameters, the energy ranking system further comprising:
       a variable on/off switch for each of the at least two power generation systems, and each of the on/off switches controlling a flow of power from the at least two power generation systems to the energy management system; and
       a ranking mechanism for ranking the order in which the at least two power generation systems provide energy to the energy management system, and the ranking mechanism recalculating the ranking order of the at least two power generation systems at predetermined intervals;
    the energy management system being positioned within the container, the energy management system having a power input in communication with the power output of the energy ranking system and a power output in communication with the power output connection of the container; and
    a storage device positioned within the container for storing energy in communication with the energy management system.

11. The apparatus for managing energy input of claim 10 wherein the predetermined set of user parameters is a cost to utilize each of the at least two power generation systems.

12. The apparatus for managing energy input of claim 10 wherein the energy ranking system further comprises a breaker in communication with each of the at least two power input connections such that activation of the breaker will cause a loss of flow of power from the corresponding power generation system to the energy ranking system.

13. The apparatus for managing energy input of claim 12 wherein the breaker is an electronically resettable breaker.

14. The apparatus for managing energy input of claim 10 wherein the energy ranking system further comprises a timer.

15. The apparatus for managing energy input of claim 10 wherein the energy management system comprises:
    a converter in communication with the power output of the energy ranking system;
    an inverter in communication with the converter;
    a switch in communication with the inverter, the switch controlling the flow of electricity to the load; and
    a controller in communication with the converter and the inverter for controlling the flow of electricity to the storage device through a battery management system.

16. The apparatus for managing energy input of claim 15 further comprising a grid energy input on the container, the grid energy input being in communication with the energy management system.

17. The apparatus for managing energy input of claim 16 wherein the grid energy input is in communication with the switch.

18. The apparatus for managing energy input of claim 10 further comprising a feedback loop in communication with the energy ranking system and the storage device for monitoring the flow of power to the storage device.

* * * * *